US007839596B2

(12) United States Patent
Shen et al.

(10) Patent No.: US 7,839,596 B2
(45) Date of Patent: Nov. 23, 2010

(54) METHOD AND APPARATUS FOR CONTROLLING THE EFFECTS OF SEEK-INDUCED VIBRATION OF A COMPONENT PART IN A HARD-DISK DRIVE

(75) Inventors: Jr-Yi Shen, Santa Clara, CA (US); Zhi Wang, Santa Clara, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 0 days.

(21) Appl. No.: 12/329,404

(22) Filed: Dec. 5, 2008

(65) Prior Publication Data

US 2010/0142086 A1      Jun. 10, 2010

(51) Int. Cl.
G11B 21/02 (2006.01)
G11B 5/596 (2006.01)
(52) U.S. Cl. ...................................... 360/75; 360/78.04
(58) Field of Classification Search .................. None
See application file for complete search history.

(56) References Cited

U.S. PATENT DOCUMENTS

| 4,477,755 | A | | 10/1984 | Rickert |
| 5,229,896 | A | * | 7/1993 | Tohyama et al. ......... 360/78.07 |
| 5,465,183 | A | | 11/1995 | Hattori |
| 5,526,208 | A | | 6/1996 | Hatch et al. |
| 6,714,378 | B1 | * | 3/2004 | Uno et al. ................. 360/78.04 |
| 6,850,386 | B2 | * | 2/2005 | Kovinskaya et al. ...... 360/78.06 |
| 7,206,162 | B2 | * | 4/2007 | Semba et al. ............. 360/78.04 |
| 7,253,989 | B1 | | 8/2007 | Lau et al. |
| 7,271,345 | B2 | | 9/2007 | Freeman et al. |
| 7,319,570 | B2 | * | 1/2008 | Jia et al. .................. 360/77.02 |
| 7,486,469 | B1 | * | 2/2009 | Semba ...................... 360/75 |
| 7,636,605 | B2 | * | 12/2009 | Takakura .................. 700/45 |
| 2006/0114601 | A1 | | 6/2006 | Semba et al. |

OTHER PUBLICATIONS

Semba, et al., "An Identification Method of Seeking-Induced Vibration Modes in Hard Disk Drives", *Hitachi Global Storage Technologies* http://www.nt.ntnu.no/users/skoge/prost/proceedings/ifac2005/Fullpapers/01848pdf, 6 pages.

(Continued)

*Primary Examiner*—K. Wong

(57) ABSTRACT

A method for controlling the effects of seek-induced vibration of a component part in a hard-disk drive. The method includes determining a resonant frequency of seek-induced vibration of the component part and a reference amplitude of a frequency-component in a first voice-coil-motor signal (VCMS) at the resonant frequency. The method also includes synthesizing a second VCMS with an amplitude of a frequency-component attenuated below the reference amplitude of the frequency-component in the first VCMS at a frequency in a resonance-band bracketing the resonant frequency. The method also includes driving a voice-coil of a voice-coil motor with the second VCMS to reduce an amplitude of a frequency-component at the resonant frequency in a second PES of the seek of the data track associated with the second VCMS below a reference amplitude of a frequency-component at the resonant frequency in the first PES associated with the first VCMS.

23 Claims, 13 Drawing Sheets

OTHER PUBLICATIONS

Brake, et al., "Optimizing Vibration Isolation of Flex Circuits in Hard Disk Drives", *Journal of Vibration and Acoustics*, vol. 127, Issue 2, (Apr. 2005),165-172.

Peng, et al., "Modeling and Analysis of Micro Hard Disk Drives", *4th International Conference on Control and Automation Proceedings*, (Jun. 10-12, 2003),952-956.

Peng, et al., "Improvement on a Hard Disk Drive Servo System Using Friction and Disturbance Compensation", *IEEE/ASME International Conference on Advanced Intelligent Mechatronics Proceedings*, vol. 2, (Jul. 20-24, 2003),1160-1165.

Wickert, "Vibration of Flex Circuits in Hard Disk Drives", www.andrew.cmu.edu/user/wickert/JAW%201ab/References_files/FLEX%20circuit%20JVA.pdf.

* cited by examiner

900

MONITOR THE FIRST POSITION-ERROR SIGNAL OF A HEAD-ARM ASSEMBLY ATTACHED TO THE VOICE-COIL MOTOR DRIVEN BY THE FIRST VOICE-COIL-MOTOR SIGNAL IN SEEKING THE TRACK ON THE MAGNETIC-RECORDING DISK
910

IDENTIFY THE RESONANT FREQUENCY
920

SHIFTING A PORTION OF AN AMPLITUDE OF A FIRST FREQUENCY-COMPONENT IN A POWER SPECTRUM OF THE FIRST VOICE-COIL-MOTOR SIGNAL AT A FIRST FREQUENCY IN A RESONANCE-BAND BRACKETING THE RESONANT FREQUENCY OF THE COMPONENT PART AWAY FROM THE RESONANT FREQUENCY TO A SECOND FREQUENCY-COMPONENT IN A POWER SPECTRUM OF THE FIRST VOICE-COIL-MOTOR SIGNAL AT A SECOND FREQUENCY FURTHER FROM THE RESONANT FREQUENCY THAN THE FIRST FREQUENCY TO PROVIDE THE POWER SPECTRUM FOR THE SECOND VOICE-COIL-MOTOR SIGNAL
1210

FIG. 12

METHOD AND APPARATUS FOR CONTROLLING THE EFFECTS OF SEEK-INDUCED VIBRATION OF A COMPONENT PART IN A HARD-DISK DRIVE

TECHNICAL FIELD

Embodiments of the present invention relate generally to the field of magnetic-recording, hard-disk drives.

BACKGROUND

The magnetic-recording, hard-disk-drive (HDD) industry is extremely competitive. The demands of the market for ever increasing storage capacity, storage speed, and other enhancement features compounded with the desire for low cost creates tremendous pressure for improved performance of the HDD. Therefore, engineers and HDD designers are constantly striving to eliminate performance detractors from the HDD design.

Just a few performance detractors that affect the HDD include adjacent track interference, poor soft error rate, compromised data integrity, long track-seek settling times, side reading and off-track recording, which often originate from new, unexpected causes. To overcome these performance detractors, engineers have endeavored to develop improved methods for writing data to and reading data from the magnetic-recording disk. New ways of servo-control are especially fruitful in overcoming these performance detractors to yield performance advantages that distinguish an HDD product in the marketplace for HDDs created in the continuing evolution of HDD technology.

SUMMARY

Embodiments of the present invention include a method for controlling the effects of seek-induced vibration of a component part in a hard-disk drive. The method includes determining a resonant frequency of seek-induced vibration of the component part and a reference amplitude of a frequency-component in a first position-error signal (PES) of a seek of a data track at the resonant frequency and a reference amplitude of a frequency-component in a first voice-coil-motor signal (VCMS) associated with the first PES at the resonant frequency. The method also includes synthesizing a second VCMS with an amplitude of a frequency-component attenuated below the reference amplitude of the frequency-component in the first VCMS at a frequency in a resonance-band bracketing the resonant frequency. The method also includes driving a voice-coil of a voice-coil motor with the second VCMS to reduce an amplitude of a frequency-component at the resonant frequency in a second PES of the seek of the data track associated with the second VCMS below a reference amplitude of a frequency-component at the resonant frequency in the first PES associated with the first VCMS.

DESCRIPTION OF THE DRAWINGS

The accompanying drawings, which are incorporated in and form a part of this specification, illustrate embodiments of the invention and, together with the description, serve to explain the embodiments of the invention:

FIG. 9 is a flow chart illustrating a method for determining the resonant frequency in the method of FIG. 8, in an embodiment of the present invention.

FIG. 12 is a flow chart illustrating an alternative method for synthesizing the second VCMS in the method of FIG. 8, in an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Figure 1:
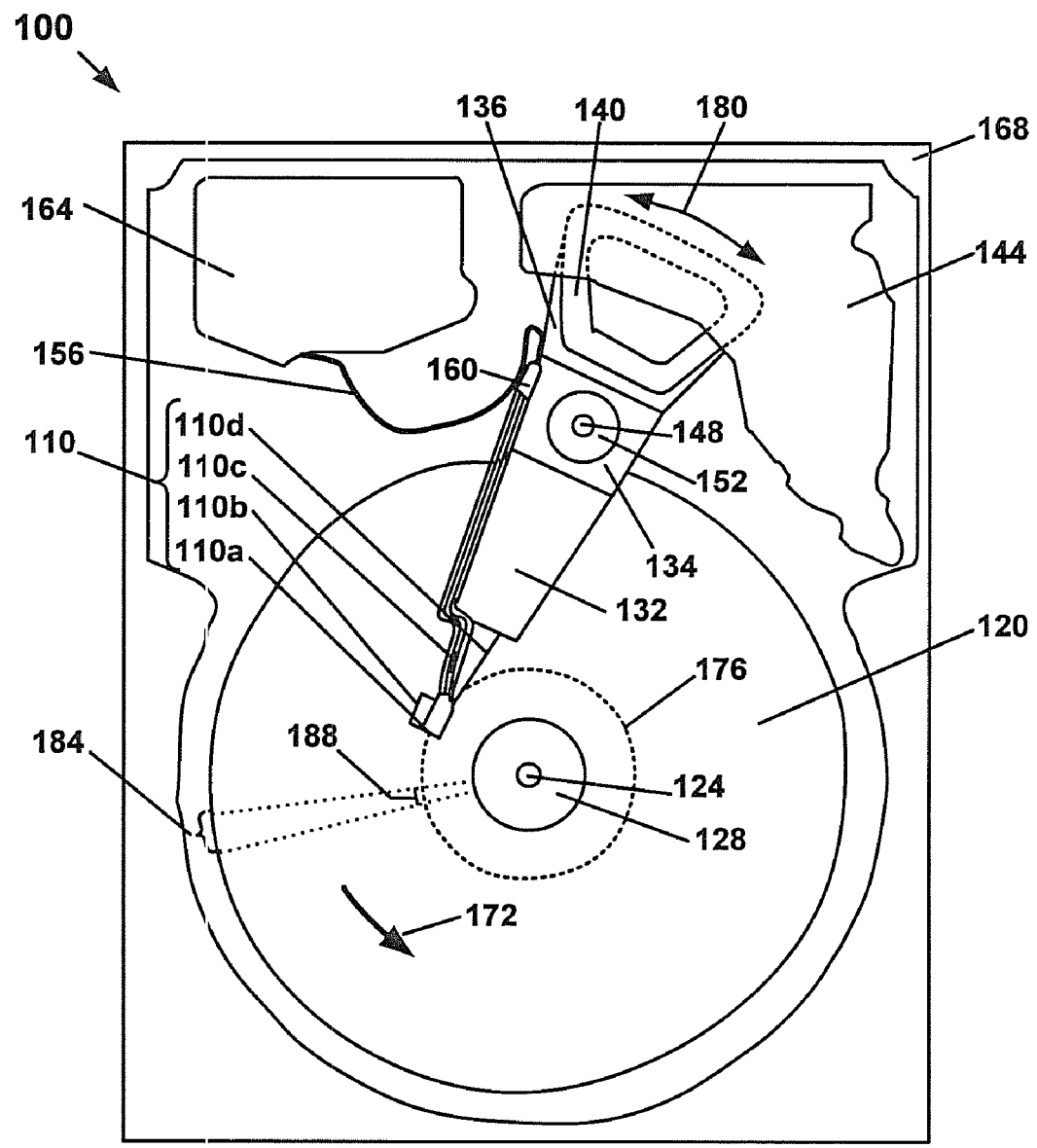
FIG. 1 is plan view of a hard-disk drive (HDD) drive that is configured to control the effects of seek-induced vibration of a component part in the HDD, and illustrates the functional arrangement of component parts in the HDD, in an embodiment of the present invention.

Physical Description of Embodiments of the Present Invention for an Apparatus for Controlling the Effects of Seek-Induced Vibration of a Component Part in a Hard-Disk Drive With reference to FIG. 1, in accordance with an embodiment of the present invention, a plan view of a hard-disk drive (HDD) 100 that is configured to control the effects of seek-induced vibration of a component part in the HDD is shown. FIG. 1 illustrates the functional arrangement of component parts in HDD 100. The HDD 100 includes at least one HGA 110 including a magnetic-recording head 110a, a lead suspension 110c attached to the magnetic-recording head 110a, and a load beam 110d attached to a slider 110b, which includes the magnetic-recording head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the magnetic-recording disk 120. The magnetic-recording head 110a includes a write element, a so-called writer, and a read element, a so-called reader, for respectively writing and reading information stored on the magnetic-recording disk 120 of the HDD 100. The magnetic-recording disk 120 or a plurality (not shown) of magnetic-recording disks may be affixed to the spindle 124 with a disk clamp 128. The HDD 100 further includes an arm 132 attached to the HGA 110, a voice-coil motor (VCM) that includes an armature 136 including a voice-coil 140 attached to the arm 132; and a stator 144 including a voice-coil magnet (not shown); the armature 136 of the VCM is attached to the arm 132 and is configured to move the arm 132 and the HGA 110 to to access portions of the magnetic-recording disk 120 being mounted on a pivot 148 with an interposed pivot bearing 152.

With further reference to FIG. 1, in accordance with an embodiment of the present invention, electrical signals, for example, current to the voice-coil 140 of the VCM, write signal to and read signal from the magnetic-recording head 110a, are provided by a flexible cable 156. Interconnection between the flexible cable 156 and the magnetic-recording head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, in conjunction with an HDD cover (not shown) provides an enclosure, which is sealed and protects the information storage components of the HDD 100.

With further reference to FIG. 1, in accordance with an embodiment of the present invention, other electronic components (not shown), including as a disk controller and servo-control electronics including a digital-signal processor (DSP), provide electrical signals to the drive motor, the voice-coil 140 of the VCM and the magnetic-recording head 110a of the HGA 110. The electrical signal provided to the drive motor enables the drive motor to spin providing a torque to the spindle 124 which is in turn transmitted to the magnetic-recording disk 120 that is affixed to the spindle 124 by the disk clamp 128; as a result, the magnetic-recording disk 120 spins in a direction 172. The spinning magnetic-recording disk 120 creates a cushion of air that acts as an air bearing on which the air-bearing surface (ABS) of the slider 110b rides so that the slider 110b flies above the surface of the magnetic-recording disk 120 without making contact with a thin magnetic-recording medium of the magnetic-recording disk 120 in which information is recorded. The electrical signal provided to the voice-coil 140 of the VCM enables the magnetic-recording head 110a of the HGA 110 to access a data track 176 on which information is recorded. Thus, the armature 136 of the VCM swings through an arc 180, which enables the HGA 110 attached to the armature 136 by the arm 132 to access various data tracks on the magnetic-recording disk 120. Information is stored on the magnetic-recording disk 120 in a plurality of concentric data tracks (not shown) arranged in sectors on the top of the magnetic-recording disk 120, for example, sector 184. Correspondingly, each data track is composed of a plurality of sectored data track portions, for example, sectored data track portion 188. Each sectored data track portion 188 is composed of recorded data and a header containing a servo-burst-signal pattern, for example, an ABCD-servo-burst-signal pattern, information that identifies the data track 176, and error correction code information. In accessing the data track 176, the read element of the magnetic-recording head 110a of the HGA 110 reads the servo-burst-signal pattern which provides information to the servo-control electronics, which controls the electrical signal provided to the voice-coil 140 of the VCM, enabling the magnetic-recording head 110a to follow the data track 176. Upon finding the data track 176 and identifying a particular sectored data track portion 188, the magnetic-recording head 110a either reads data from the data track 176 or writes data to the data track 176 depending on instructions received by the disk controller from an external agent, for example, a microprocessor of a computer system.

With further reference to FIG. 1, in accordance with an embodiment of the present invention, a plan view of a head-arm-assembly (HAA) is shown. FIG. 1 illustrates the functional arrangement of the HAA with respect to VCM and HGA 110. The HAA includes the HGA 110 and the arm 132. The HAA is attached at the arm 132 to a carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 1, the armature 136 of the VCM is attached to the carriage 134 and the voice-coil 140 is attached to the armature 136. The AE module 160 may be attached to the carriage 134 as shown. The carriage 134 is mounted on the pivot 148 with the interposed pivot bearing 152.

Figure 2:
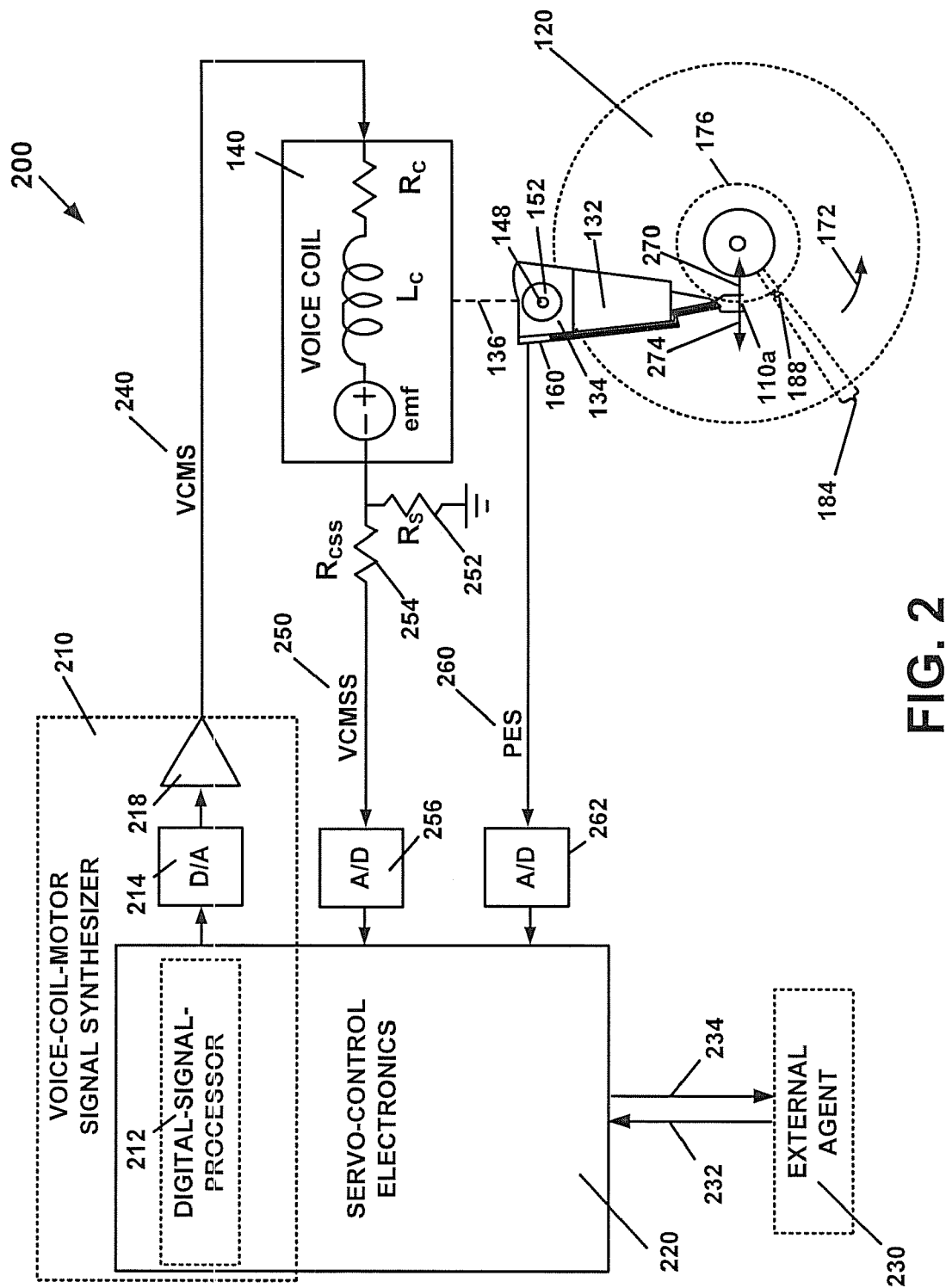
FIG. 2 is a schematic diagram of a plant for servo control of the position of a magnetic-recording head for seeking a data track on a magnetic-recording disk to which data is written and from which data is read, and illustrates a voice-coil-motor (VCM) circuit configured to control the effects of seek-induced vibration of a component part in the HDD of FIG. 1, in an embodiment of the present invention.

With reference now to FIG. 2, in accordance with an embodiment of the present invention, a schematic diagram 200 of a plant, a term of art for the servo-control system shown in FIG. 2 exclusive of external agent 230, is shown for servo control of the position of the magnetic-recording head 110a for seeking the data track 176 on the magnetic-recording disk 120, to which data is written and from which data is read. FIG. 2 shows a VCM circuit that is configured to control the effects of seek-induced vibration of a component part in the HDD 100 of FIG. 1. The VCM circuit includes a voice-coil-motor-signal (VCMS) synthesizer 210 configured to generate a VCMS 240 for the seek of the data track 176. The VCM circuit also includes the VCM electrically coupled to the VCMS synthesizer 210. The VCM is configured to be driven with the VCMS 240. The VCMS synthesizer 210 includes a DSP 212 instructed to generate a digital signal for synthesizing the VCMS, a digital-to-analog convertor (DAC) 214 electrically coupled to the DSP 212 wherein the DAC 214 converts the digital signal into an analog signal, and a voice-coil driver 218 to amplify the analog signal to generate the VCMS 240. As shown in FIG. 2, the voice-coil 140 may be modeled as an inductor with inductance, $L_c$, in series with a resistor with resistance, $R_c$, in series with a voltage source producing an electromotive force (emf). VCMS 240 sent to voice-coil 140 passes through the voice-coil 140 and sense resistor 252 with resistance, $R_s$. The voltage drop across the sense resistor 252 is detected through a high resistance coupling resistor 254 with resistance, $R_{css}$, to provide a VCM sense signal (VCMSS) 250. VCMSS 250 is fed back through analog-to-digital convertor (ADC) 256 to servo-control electronics 220, which are used to control the motion of the rotary actuator including arm 132, HGA 110, armature 136 (see FIG. 1, indicated by dashed line 136 in FIG. 2) including voice-coil 140, carriage 134, and pivot bearing 152 mounted on pivot 148 to enable access of the data track 176 on the magnetic-recording disk 120 by magnetic-recording head 110a.

As used herein, a seek is a movement of the rotary actuator including the magnetic-recording head 110a is response to a VCMS 240 from a starting position to a target data track, for example, data track 176, traversing the magnetic-recording disk 120 in a forward direction 270, or a reverse direction 274, that has a seek-length measured by the number of data tracks, or the equivalent thereof, between the starting position and the target data track, for example, data track 176. As shown in FIG. 2, a forward seek is from a position located closer to the outside-diameter (OD) of the magnetic-recording disk 120 than the target track; and, a reverse seek is from a position located closer to the ID of the magnetic-recording disk 120 than the target track. Therefore, a particular seek may be defined by a seek-length, a seek direction, such as forward or reverse, and the location of the target data track; alternatively, a particular seek may be defined by a starting position and the location of the target data track; and alternatively, a particular seek may be defined by the location of the starting position, a seek-length and a seek direction, such as forward or reverse. As described herein, a particular seek is described by a seek-length, a seek direction, such as forward or reverse, and a location of the target data track.

With further reference to FIG. 2, in accordance with an embodiment of the present invention, the servo-control electronics 220 may include DSP 212, a microprocessor, one or more memories, a clock, timing circuits, and input and output drivers and buffers. A memory in the servo-control electronics 220 may serve as a firmware module configured as a computer-readable storage medium having computer-executable instructions for performing the method for controlling the effects of seek-induced vibration of a component part in a HDD, in accordance with embodiments of the present invention. The firmware module may include any of a variety of non-volatile memory modules storing the computer-executable instructions in a computer-readable storage medium.

Input instructions 232 including computer-executable instructions for performing the method for controlling the effects of seek-induced vibration of a component part in a HDD may be input by external agent 230, which may include a HDD, a CD, a floppy disk, or other memory device storing the computer-executable instructions in a computer-readable storage medium, and stored in memory of the servo-control electronics 220, which may include non-volatile memory, such as the firmware module described above, or in volatile memory modules such as random access memory (RAM). If the input instructions 232 including computer-executable instructions for performing the method for controlling the effects of seek-induced vibration of a component part in a HDD of embodiments of the present invention are stored in a volatile memory, such storage is not to be construed as limiting embodiments of the present invention, because, if such storage in a volatile memory occurs, embodiments of the present invention will also include computer-executable instructions for performing the method of embodiments of the present invention stored in a tangible, computer-readable storage medium. The input instructions 232 may also include other instructions to the servo-control electronics 220. In addition, the external agent 230 may receive output signals 234 from the servo-control electronics 220, such as output signals that may characterize the movement of the rotary actuator, in particular, a position-error signal (PES) associated with a VCMS 240 for a seek of a data track, for example, data track 176.

With further reference to FIG. 2, in accordance with an embodiment of the present invention, the operation of the servo-control system shown in FIG. 2 is further described. The magnetic recording disk 120 is spun up in direction 172. In response to load instructions, received as input instructions 232, the actuator loads the HGA 110 onto the magnetic-recording disk flying above the disk due to the action of the ABS, as previously described in FIG. 1. Input instructions 232 are sent to the servo-control electronics 220 to generate a seek of a data track, for example, data track 176. The DSP 212 produces a digital signal in response to the input instructions 232 for generating the seek of the data track. The digital signal is sent to DAC 214 to convert the digital signal into an analog signal which is fed to voice-coil driver 218. Voice-coil driver 218 amplifies the analog signal to generate VCMS 240, which drives VCM. VCM is attached to arm 132 by armature 136; the arm 132 is attached to HGA 110 which includes magnetic-recording head 110a at the distal end of slider 110b. In response to VCMS 240, the voice-coil 140 moves the armature 136, which moves the magnetic-recording head 110a to the data track 176. The position of the magnetic-recording head 110a is provided in a feedback signal provided by PES 260 output from the read element of the magnetic-recording head 110a from embedded servo information in the data track 176. The embedded servo information may be in the form of a sectored servo pattern such as the ABCD-servo-burst-signal pattern, described above. The PES 260 is sent from the read element of magnetic-recording head 110a via AE module 160 and is input to ADC 262 which sends the PES 260 in digital form to the servo-control electronics 220. In conjunction with VCMSS 250 obtained from the sense resistor 252 electrically coupled to the voice-coil 140, PES 260 provides feedback control in positioning the actuator so that magnetic-recording head 110a follows the data track 176.

With further reference to FIG. 2 and as is subsequently described in greater detail in FIGS. 3A, 3B, 4 and 5, in accordance with an embodiment of the present invention, input instructions 232 including computer-executable instructions for performing the method for controlling the effects of seek-induced vibration of a component part in a HDD may be input into the servo-control electronics 220 for the generation of an arbitrary VCMS used to provide a seek of a data track, similar to VCMS 240, by VCMS synthesizer 210. As the inventors have found, such an arbitrarily chosen VCMS may adventitiously also have deleterious effects, and as such may provide a first VCMS that may be used to excite a resonant frequency of a seek-induced vibration of a component part of HDD 100. Thus, the first VCMS may be used in characterizing the frequency response of the component part of HDD 100, for example, flexible cable 156. Embodiments of the present invention also apply, without limitation thereto, to a component part of an HDD, for example HDD 100, that is: a flexible cable, for example, flexible cable 156; an HAA; and, an enclosure of an HDD. The voice-coil driver 218 of VCMS synthesizer 210 drives the voice-coil 140 of the VCM with the first VCMS. In response to the first VCMS, the actuator with magnetic-recording head 110a performs a seek of a data track, for example, data track 176. The read element of magnetic-recording head 110a sends a first PES, for example, similar to PES 260, associated with and induced by the first VCMS. The first PES contains information about the frequency response of the vibration of the component part of HDD 100, for example, flexible cable 156, to the servo-control electronics 220. For the seek of the data track, the resonant frequency and a reference amplitude of a frequency-component in the first PES at the resonant frequency may be determined from output signals 234 sent to the external agent 230 from servo-control electronics 220. Also, a reference amplitude of a frequency-component in a first VCMS associated with the first PES at the resonant frequency may be measured at the output of VCMS synthesizer 210, or inferred from the VCMSS associated with the first VCMS, or inferred from the output characteristics of the VCMS synthesizer 210 from performance data for input instructions 232 known to generate a given VCMS, such as the first VCMS.

With further reference to FIG. 2 and as is subsequently described in greater detail in FIGS. 3A, 3B, 4 and 5, in accordance with an embodiment of the present invention, input instructions 232 including computer-executable instructions for performing the method for controlling the effects of seek-induced vibration of a component part in a HDD may be input into the servo-control electronics 220 for the generation of a second VCMS, similar to VCMS 240, by VCMS synthesizer 210. The second VCMS generated by the voice-coil driver 218 of VCMS synthesizer 210 is used to drive the voice-coil 140 of the VCM. The second VCMS also excites a resonant frequency of a seek-induced vibration of a component part of HDD 100 which is characterized for the frequency response of the component part of HDD 100, for example, flexible cable 156. In response to the second VCMS, the actuator with magnetic-recording head 110a performs the same seek of the same data track, for example, data track 176, as was performed for the first VCMS. The limitation "the same seek of the same data track as was performed for the first VCMS" means that the seek of the data track for the second VCMS has the same seek-length in the same direction to the same target track as the seek of the data track for the first VCMS. The read element of magnetic-recording head 110a sends a second PES, for example, similar to PES 260, associated with and induced by the second VCMS. The second PES contains information amount the frequency response of the vibration of the component part of HDD 100, for example, flexible cable 156, to the servo-control electronics 220. For the seek of the data track, the resonant frequency and a reference amplitude of a frequency-component in the second PES at the resonant frequency may be determined from output signals 234 sent to the external agent 230 from servo-control electronics 220. Also, the amplitude of a frequency-component in a second VCMS associated with the second PES at the resonant frequency may be measured at the output of VCMS synthesizer 210, or inferred from the VCMSS associated with the first VCMS, or inferred from the output characteristics of the VCMS synthesizer 210 from performance data for input instructions 232 known to generate a given VCMS, such as the second VCMS.

With further reference to FIG. 2 and as is subsequently described in greater detail in FIGS. 3A, 3B, 4 and 5 in accordance with an embodiment of the present invention, the input instructions 232 may be varied until a second VCMS is synthesized with an amplitude of a frequency-component of the second VCMS attenuated below the reference amplitude of the frequency-component in the first VCMS at a frequency in a resonance-band bracketing the resonant frequency, as described in more detail for the discussion of FIGS. 3B and 5. When the second VCMS is synthesized such that the amplitude of a frequency-component of the second VCMS is attenuated below the reference amplitude of the frequency-component in the first VCMS at a frequency in a resonance-band bracketing the resonant frequency, the second VCMS may be used to drive the voice-coil 140 of the VCM to reduce an amplitude of a frequency-component in the second PES of the seek of the data track associated with the second VCMS below the reference amplitude of the frequency-component in the first PES associated with the first VCMS. Thus, the VCM circuit includes a VCMS synthesizer 210 configured to generate a second VCMS for a seek of a data track with an amplitude attenuated below a reference amplitude of a frequency-component of a first VCMS for the seek of the data track at a frequency in a resonance-band bracketing a resonant frequency of the vibration of the component part. The VCM circuit also includes a VCM electrically coupled to the VCMS synthesizer 210 and configured to be driven with the second VCMS to reduce an amplitude of a frequency-component at the resonant frequency in a second PES associated with the second VCMS of the seek of the data track below a reference amplitude of a frequency-component in a first PES associated with the first VCMS of the seek of the data track. Consequently, the second VCMS controls the effects of seek-induced vibration of the component part in the HDD; the control of such effects include, without limitation thereto, reduction of settling time in seeking the data track on the magnetic-recording disk, reduction in error rates, both hard error rate and soft error rate (SER) in reading data from a data track, and reduction in adjacent track interference (ATI). In particular, the second VCMS decreases settling time below a settling time for the first VCMS in seeking the data track on the magnetic-recording disk. The second VCMS also improves on-track recording performance by controlling seek-induced vibrations when a track is being written by a write element of a magnetic-recording head, so that there is less track squeeze, and improved data integrity.

Figure 3A:
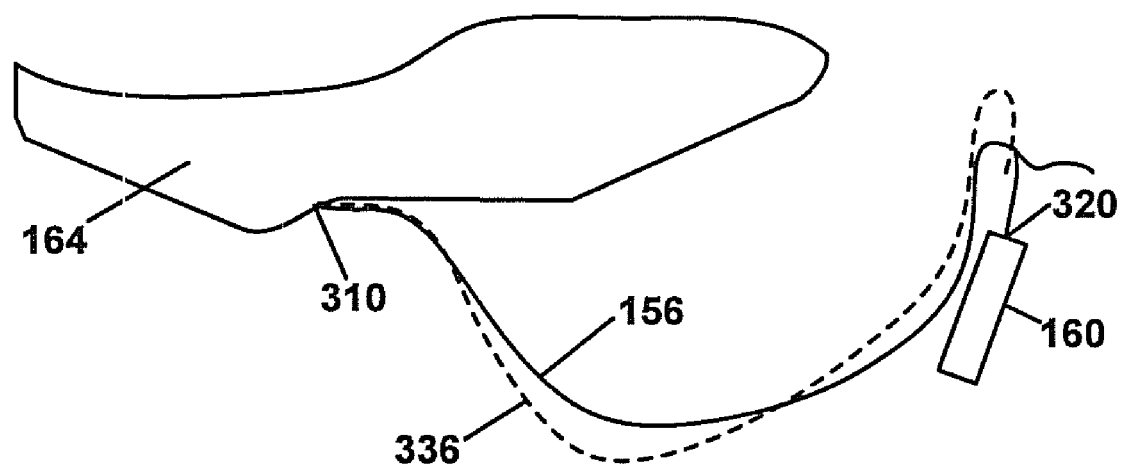
FIG. 3A is detailed plan view of a flexible cable and component parts to which the flexible cable is anchored illustrating a first bending mode vibration of the flexible cable excited in a seek of a data track, which demonstrates a problem recognized by the inventors motivating embodiments of the present invention, in an embodiment of the present invention.

With reference now to FIG. 3A, in accordance with an embodiment of the present invention, a detailed plan view 300A of the flexible cable 156 and component parts: electrical-connector block 164 and AE module 160, to which the flexible cable 156 is anchored are shown. FIG. 3A shows a first bending mode vibration of the flexible cable 156 excited in a seek of a data track, for example, data track 176, which demonstrates a problem recognized by the inventors motivating embodiments of the present invention. The flexible cable 156 is secured at a first end 310 to the electrical-connector block 164 and at a second end 320 to the AE module 160. As the actuator moves, the AE module 160 attached to the actuator moves the flexible cable 156 attached to the second end 320 of the flexible cable 156 attached to the AE module 160 to a new position, which forces the flexible cable 156 to take on a new shape 336. Consequently, the flexible cable 156 is bent and this bending motion has a first bending mode with a resonant frequency. Such resonances can have a deleterious affect on the seek of a data track, for example, data track 176, that induce ringing in the PES, referred to by the term of art random transient vibration (RTV), which increases settling time on the data track, described in more detail in the discussion of FIG. 4. The inventors have modeled the motion of the flexible cable 156 with finite element analysis (FEA) and calculated a frequency-response function (FRF) for the motion of the flexible cable 156, from which a resonant frequency of a seek-induced vibration of a component part in the HDD 100, for example, flexible cable 156, may be determined. Determining the resonant frequency includes modeling a mechanical response of the component part, for example, flexible cable 156, to forces applied to the component part by the VCM driven in response to the first VCMS, similar to VCMS 240, in seeking the data track 176 on the magnetic-recording disk 120, analyzing the mechanical response to determine a frequency spectrum, identified with the FRF, of the mechanical response and identifying in the frequency spectrum, such as the FRF, the resonant frequency, for example, resonant frequency of flexible cable 156.

Figure 3B:
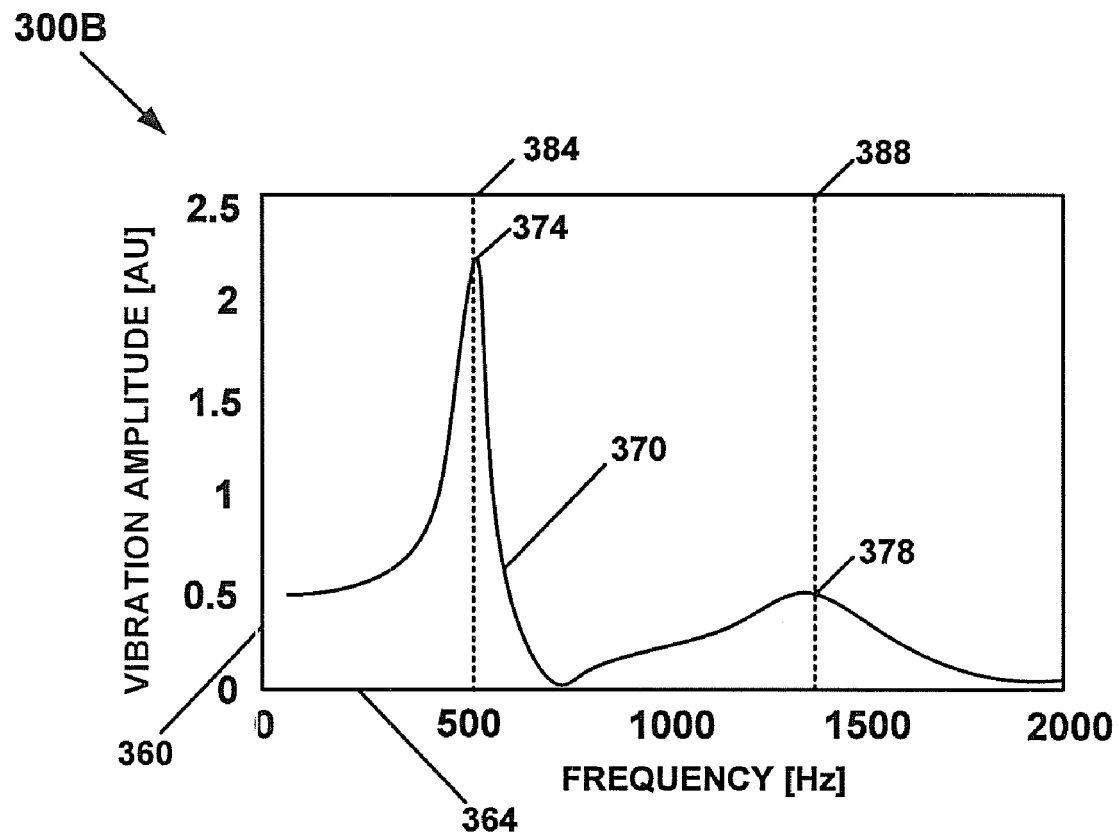
FIG. 3B is a plot of a frequency response function of the flexible cable of FIG. 3A illustrating amplitudes of frequency-components in the frequency spectrum, for example, a frequency response function (FRF), of the first bending mode vibration and a second mode of vibration, and respective resonant frequencies of these seek-induced vibrations, obtained from a finite element analysis modeling the mechanical response of the flexible cable to forces applied by the VCM driven in response to a first VCM signal in seeking a data track on a magnetic-recording disk, in an embodiment of the present invention.

With reference now to FIG. 3B, in accordance with an embodiment of the present invention, a plot 300B of a FRF of the flexible cable 156 of FIG. 3A is shown. FIG. 3B shows amplitudes 374 and 378 of frequency-components in frequency spectrum 370, identified with the FRF, and respective resonant frequencies 384 and 388 of seek-induced vibrations. As discussed above for FIG. 3A, the frequency spectrum 370 is obtained from FEA modeling of the mechanical response of the flexible cable 156 to forces applied by the VCM driven in response to a first VCMS, similar to VCMS 240, in seeking a data track, for example, data track 176, on the magnetic-recording disk 120. Ordinate 360 of the plot 300B of the FRF is given in arbitrary units (AU) of vibration amplitude; and, abscissa 364 of the plot 300B of the FRF is given in units of Heitz (Hz) of frequency of the vibration of flexible cable 156. The amplitude 374 of a frequency-component in the frequency spectrum 370, identified with the FRF, at the first bending mode vibration, and the amplitude 378 of frequency-component in the frequency spectrum 370 at a second mode of vibration are shown in FIG. 3B. Also, the resonant frequency 384 of the frequency-component in the frequency spectrum 370 at the first bending mode vibration and the resonant frequency 388 of the frequency-component in the frequency spectrum 370 at a second mode of vibration are shown in FIG. 3B.

With further reference now to FIG. 3B, in accordance with an embodiment of the present invention, the resonant frequency 384 of the first bending mode of flexible cable 156 is at about 550 Hz, and the resonant frequency 388 of the second mode of vibration of flexible cable 156 is at about 1375 Hz. The resonance centered on the resonant frequency 384 at 550 Hz is rather sharply peaked, having a high Q, with a relatively narrow resonance-band bracketing the resonant frequency 384, the full-width-at-half-maximum (FWHM) being about 125 Hz. The resonance centered on the resonant frequency 388 at 1375 Hz is rather broad, having a low Q, with relatively wide resonance-band bracketing the resonant frequency 1375 Hz, the full-width-at-half-maximum (FWHM) being about 580 Hz. Embodiments of the present invention utilize the principle that driving a resonance with an excitation inside the resonance band of the resonance is less effective in exciting such a resonance if the amplitude of the excitation in attenuated. Alternatively, embodiments of the present invention utilize the principle, so-called "frequency shifting," that driving a resonance with an excitation inside the resonance band of the resonance is less effective in exciting such a resonance if the amplitude, or a portion of the amplitude, of the excitation is shifted away from the resonance-band to a non-resonant frequency, or at least to a frequency further from the resonant frequency, for example, to frequency within the resonance band less effective in exciting the resonance. For example, shifting an excitation in a resonance-band away from a resonance with high Q to the tails of the resonance-band bracketing the resonant frequency will result in reduced excitation of the resonance. The inventors have found that the source of such excitations lies in the harmonic content of the VCMS, such as VCMS 240, applied to VCM. In principle, this type of analysis can be applied to any component part of the HDD; and, embodiments of the present invention are not to be construed as limited to seek-induced RTV having its origin in seek-induced vibrations of the flexible cable 156, but apply without limitation to any component part of the HDD.

Figure 4:
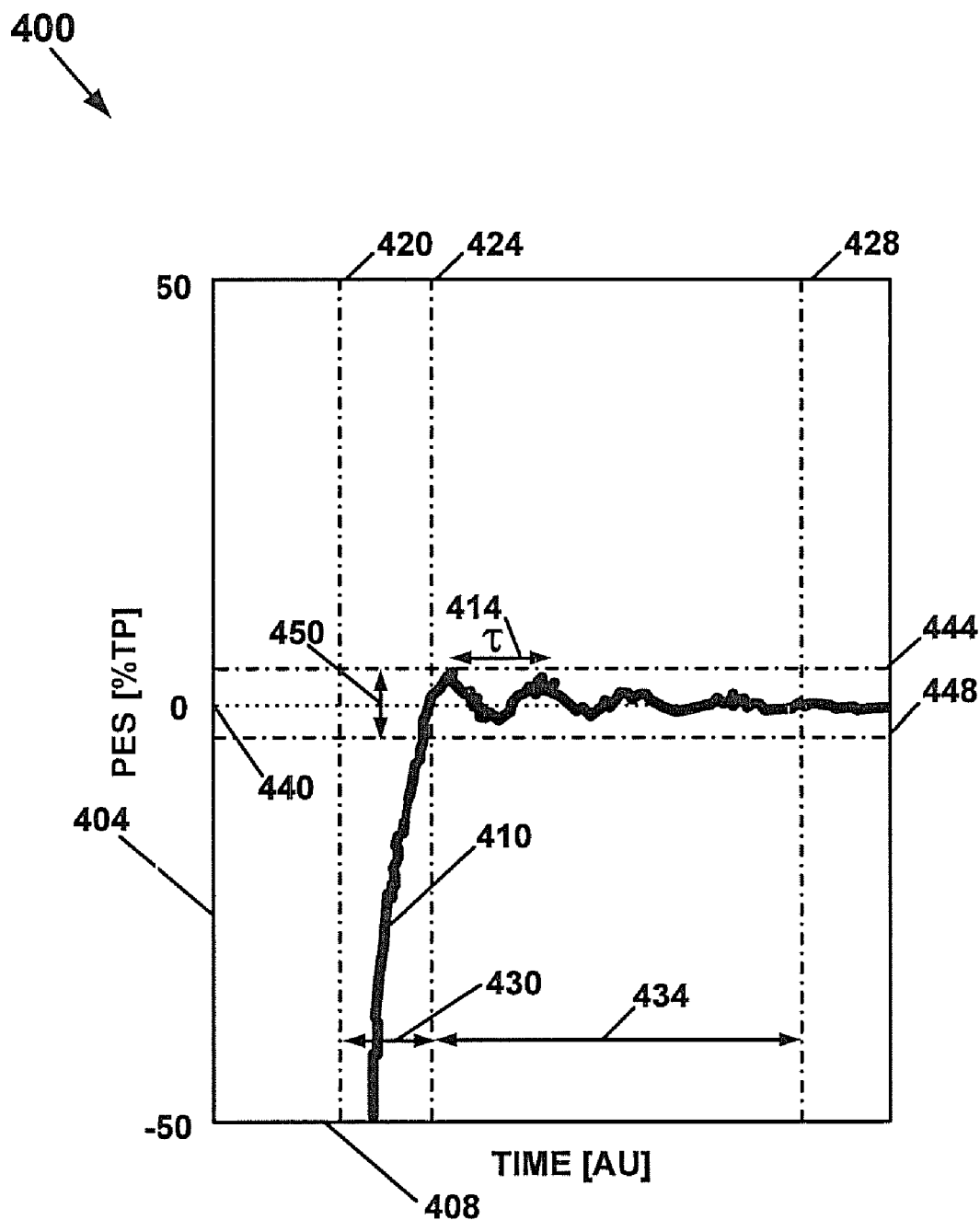
FIG. 4 is a plot of a position-error signal (PES) for a reverse seek to an inside-diameter (ID) data track with a 10,000 data track seek-length, which demonstrates seek-induced, random transient vibration (RTV) in the PES, in an embodiment of the present invention.

With reference now to FIG. 4, in accordance with an embodiment of the present invention, a plot 400 of PES 410 for a reverse seek to an inside-diameter (ID) data track with a 10,000 data track seek-length is shown. FIG. 4 demonstrates seek-induced RTV in the PES 410, which appears as a characteristic ringing about an average amplitude 440 of the PES 410. Ordinate 404 of the plot 400 of the PES 410 is given in units of percentage of track pitch (TP), where TP is defined as the center-to-center spacing of recorded data tracks, for example, data track 176 and a data track adjacent thereto (not shown); and, abscissa 408 of the plot 400 of the PES 410 is given in arbitrary units (AU) of time. Therefore, the PES 410 gives a measure of the deviation of the read element of the magnetic-recording head 110a at the distal end of the HAA and actuator from the center of the data track, for example, data track 176. As shown in FIG. 4, seek-induced RTV has a characteristic frequency, $v_C$, given by the reciprocal of period 414, τ, so that: $v_C=1/\tau$. The seek-induced RTV has an initial peak-to-peak (p-t-p) amplitude 450, which is given by separation between amplitude 444 of the first peak in the ringing waveform on the PES 410 and amplitude 448 of the first minimum in the ringing waveform on the PES 410; the amplitude of the seek-induced RTV eventually damps out after an extinction time 434, which may be given by separation between the time 424 when PES 410 crosses the average amplitude 440 and the time 428 when the ringing waveform on the PES 410 is indistinguishable above background noise riding on the PES 410. In arriving at the target data track of a seek, a seek time 420 transpires during which the actuator traverses the seek-length, here 10,000 data tracks; the seek time 420 is given by separation between the time 428 when the actuator begins to move after the voice-coil 140 receives the VCMS, similar to VCMS 240, for the seek and the time 424 when PES 410 crosses the average amplitude 440. The settling time (not shown) is the time it takes for the PES 410 to settle down to a level where the data track can be written to or read from with minimum error. The settling time is less than the extinction time 434 and depends on the acceptable error rate for the HDD design, which depends on a variety of factors including the use of error correction codes (ECCs) and read channel and write channel electronics. However, a long extinction time 434 will cause a lengthy settling time; and, therefore, it is desirable to reduce the seek-induced RTV associated with the effects of seek-induced vibration of a component part, for example, flexible cable 156, in the HDD 100.

With further reference to FIG. 4, in accordance with an alternative embodiment of the present invention, the PES 410 may be analyzed to characterize seek-induced RTV and thus to indirectly measure the effects of seek-induced vibration of a component part, for example, flexible cable 156, in the HDD 100 on reading and writing of information to and from a data track, for example, data track 176, which determine performance parameters of the HDD, for example, settling time, SER, data integrity and ATI. For example, the PES 410 may be analyzed to characterize seek-induced RTV to determine the resonant frequency. Determining the resonant frequency includes monitoring the first PES associated with the first VCMS, for example, similar to PES 410, of the HAA attached to the VCM driven by the first VCMS, similar to VCMS 240, in seeking the data track, for example data track 176, on the magnetic-recording disk 120, and identifying the resonant frequency, $\nu_C = 1/\tau$, for example, given by the reciprocal of the period 414, $\tau$, in the seek-induced RTV of the PES, for example, PES 410, which is associated with the seek-induced vibration of a component part, for example, flexible cable 156, in the HDD. For example, the PES may be analyzed to characterize seek-induced RTV to determine the reference amplitude of a frequency-component in a first PES associated with the first VCMS, for example, similar to PES 410, of a seek of a data track at the resonant frequency. Determining the reference amplitude of a frequency-component in the first PES, for example, similar to PES 410, of a seek of a data track at the resonant frequency may include measuring the initial p-t-p amplitude of the seek-induced RTV, for example, initial p-t-p amplitude 450, excited by the first VCMS, similar to VCMS 240. Similarly, the PES may be analyzed to characterize seek-induced RTV to determine the amplitude of a frequency-component in the second PES associated with the second VCMS, for example, similar to PES 410, for the same seek of the same data track sought with the first VCMS at the same resonant frequency. Determining the amplitude of a frequency-component in the second PES, for example, similar to PES 410, for the same seek of the same data track sought with the first VCMS at the same resonant frequency may also include measuring the initial p-t-p amplitude of the seek-induced RTV, for example, initial p-t-p amplitude 450, excited by the second VCMS, similar to VCMS 240.

Figure 5:
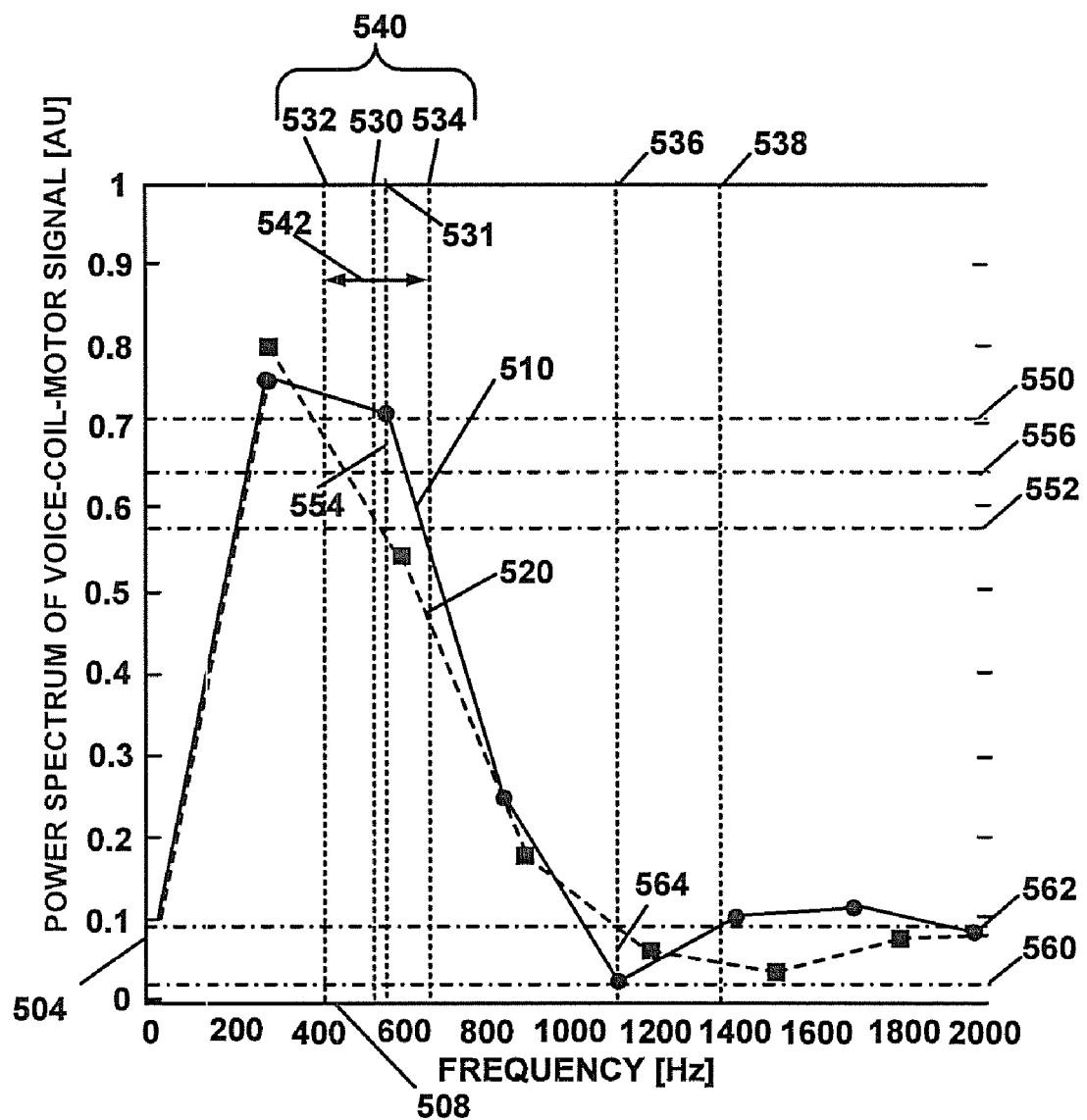
FIG. 5 is a plot of power spectra of a first voice-coil-motor signal (VCMS) and a second VCMS showing the effect of attenuation of an amplitude of a frequency-component of the VCMS below a reference amplitude of a frequency-component in the first VCMS at a frequency in a resonance-band bracketing a resonant frequency of a component part in the HDD, the flexible cable of FIG. 3A, in an embodiment of the present invention.

With reference now to FIG. 5, in accordance with an embodiment of the present invention, a plot 500 of power spectra 510 and 520 of a respective first VCMS and second VCMS is shown. As reflected in the power spectra 510 and 520 of the respective first VCMS and second VCMS, FIG. 5 shows the effect of attenuation of an amplitude of a frequency-component in the second VCMS below a reference amplitude of a frequency-component in the first VCMS at a frequency, identified with first frequency 531, in a resonance-band 540 bracketing a resonant frequency 530 of a component part, for example, flexible cable 156, in the HDD 100. The power spectrum 510 of the first VCMS is the product of the Fourier Transform (FT) of the first VCMS with the complex conjugate of the FT of the first VCMS; and, the power spectrum 520 of the second VCMS is the product of the FT of the second VCMS with the complex conjugate of the FT of the second VCMS. Although the following discussion is framed in terms of the power spectra of these signals for the sake of elucidating more fully embodiments of the present invention, the discussion is easily related to the first VCMS and the second VCMS through the inverse FT. Therefore, FIG. 5 shows the effect of attenuation of an amplitude 552 of a first frequency-component in the power spectrum 520 of the second VCMS below a reference amplitude 550 of a first frequency-component in the power spectrum 510 of the first VCMS at the first frequency 531 in a resonance-band 542 bracketing the resonant frequency 530 of a component part, for example, flexible cable 156, in the HDD 100. Ordinate 504 of the plot 500 of the power spectra 510 and 520 of the respective first VCMS and second VCMS is given in arbitrary units (AU) normalized to unity; and, abscissa 508 of the plot 400 of the power spectra 510 and 520 of the respective first VCMS and second VCMS is frequency given in units of Hertz (Hz). Also, as shown in FIG. 5, the resonance-band 540 bracketing the resonant frequency 530 has band-width 542, which is given by the difference between the upper frequency 534 of the resonance-band 540 and the lower frequency 532 of the resonance-band 540. The resonant frequency 538 of a third frequency-component in the power spectrum 510 of the first VCMS at a second mode of vibration is also shown. For FIG. 5, the first VCMS and the second VCMS are in the form of current signals, or current waveforms, provided to the VCM; but, embodiments of the present invention apply also to other forms of VCMS provided to the VCM such as voltage signal, or voltage waveform, without limitation thereto.

With further reference to FIG. 5, in accordance with an embodiment of the present invention, the use of "frequency shifting" to control the effects of seek-induced vibration of a component part, for example, flexible cable 156, in an HDD, for example, HDD 100, is illustrated. The use of frequency shifting in synthesizing the power spectrum 520 of the second VCMS from the power spectrum 510 of the first VCMS by means of the VCMS synthesizer 210 of FIG. 2 is shown. VCMS synthesizer 210 is configured to shift a portion 554 of an amplitude, identified with reference amplitude 550, of a first frequency-component in a power spectrum 510 of the first VCMS at the first frequency 531 in a resonance-band 542 bracketing the resonant frequency 530 of the component part, for example, flexible cable 156, away from the resonant frequency 530 to a second frequency-component in a power spectrum of the first VCMS at a second frequency 536 further from the resonant frequency 530 than the first frequency 531 to produce the power spectrum 520 for the second VCMS. The frequency shifting is accomplished by instructing the DSP 212 of VCMS synthesizer 210 to generate a digital signal for synthesizing the second VCMS, similar to VCMS 240, through input instructions 232 received by the servo-control electronics 220, as previously described in the discussion of FIG. 2. A suitable set of input instructions 232 received by the servo-control electronics 220 for frequency shifting to control the effects of seek-induced vibration of a component part in a HDD 100 may be found by monitoring through the output signals 234 the corresponding second PES generated by the input instructions 232 to confirm that an amplitude of a frequency-component at the resonant frequency 530 in a second PES of the seek of the data track associated with the second VCMS is below the reference amplitude of the frequency-component in the first PES associated with the first VCMS.

With further reference to FIG. 5, in accordance with an embodiment of the present invention, the portion 554 of the amplitude, identified with reference amplitude 550, of the first frequency-component in the power spectrum 510 of the first VCMS at the first frequency 531 is given by the difference between the reference amplitude, identified with reference amplitude 550, of a first frequency-component in the power spectrum 510 of the first VCMS at first frequency 531 and a reduced amplitude 556 of a frequency-component in the power spectrum 510 of the first VCMS at first frequency 531. The portion 554 may be viewed as being shifted to the second frequency-component and added to the amplitude 560 of the second frequency-component in a power spectrum of the first VCMS at the second frequency 536 further from the resonant frequency 530 than the first frequency 531 to produce an amplitude 562 of a second frequency-component in the power spectrum 520 of the second VCMS at the second frequency 536. The portion 564 of the amplitude 562 of the second frequency-component in the power spectrum 520 of the second VCMS at the second frequency 536 is given by the difference between the amplitude 562 of a second frequency-component in the power spectrum 520 of the second VCMS at second frequency 536 and the amplitude 560 of a second frequency-component in the power spectrum 510 of the first VCMS at second frequency 536. The portion 554 of the amplitude, identified with reference amplitude 550, of the first frequency-component in the power spectrum 510 of the first VCMS may be shifted to the second frequency 536 which may be a non-resonant frequency as shown, or at least to a frequency further from the resonant frequency 530, for example, to frequency within the resonance-band 540 less effective in exciting the resonance. For example, a frequency within the resonance-band 540 less effective in exciting the resonance at resonant frequency 530 may lay between first frequency 531 and the upper frequency 534 of the resonance-band 540. The remaining portion of the amplitude difference between reference amplitude 550 of the first frequency-component in the power spectrum 510 of the first VCMS at first frequency 531 and the amplitude 552 of the first frequency-component in the power spectrum 520 of the second VCMS may be viewed as being shifted to one or more frequency-components, and shared out in further portions added to one or more respective amplitudes of the respective frequency-components in the power spectrum of the first VCMS at frequencies further from the resonant frequency 530 than the first frequency 531 to produce the power spectrum 520 for the second VCMS. As a result of frequency shifting, the excitation energy delivered at the resonant frequency 530 of 550 Hz of the first bending mode to the flexible cable 156 by the second VCMS is reduced compared with the excitation energy delivered by the first VCMS.

Figure 6:
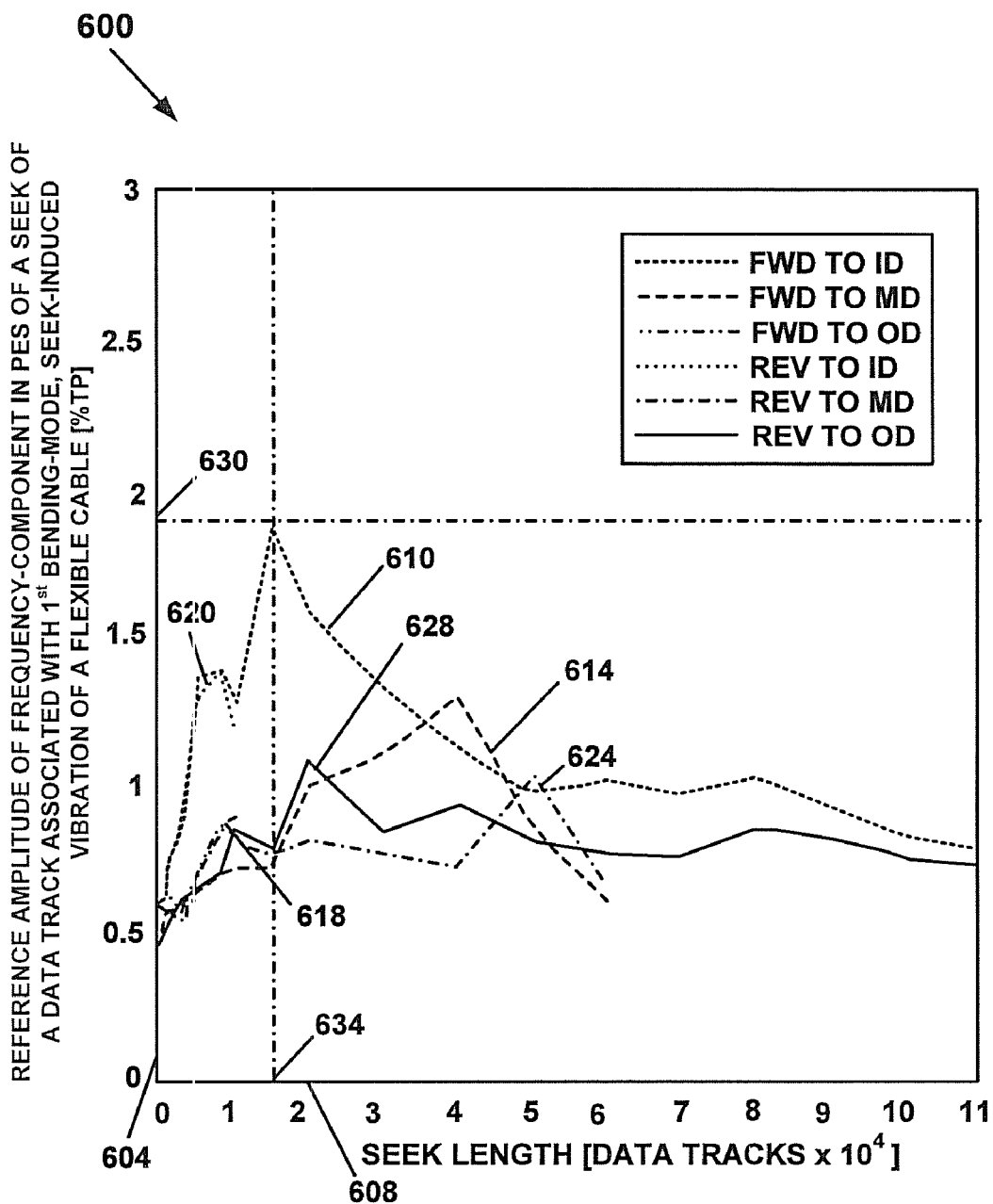
FIG. 6 is a plot of reference amplitudes of a frequency-component in the PES associated with a seek-induced vibration of a component part in the HDD, the first bending mode vibration of the flexible cable of FIG. 3A, for various seeks to various data tracks as a function of seek-length, in an embodiment of the present invention.

With reference now to FIG. 6, in accordance with an embodiment of the present invention, a plot 600 of reference amplitudes of a frequency-component in first position error signals (PESs), similar to initial p-t-p amplitude 450 of the seek-induced RTV of the PES 410 shown in FIG. 4, is shown. The reference amplitudes are associated with a resonant frequency of a seek-induced vibration of a component part in the HDD, for example, the first bending mode vibration of the flexible cable 156 of FIG. 3A, for example, excited by a first VCMS in a seek to a data track, for example, data track 176. The reference amplitudes are shown as a function of various seeks to various data tracks as a function of seek-length. Each of the seeks is generated by a different first VCMS. Ordinate 604 of the plot 600 of the reference amplitudes is the percentage amplitude of the frequency component in the first PES of a seek to a data track, for example, data track 176, associated with the first bending-mode vibration of a flexible cable, for example, flexible cable 156; the ordinate 604 is given in units of percentage of TP. Abscissa 608 of the plot 600 of reference amplitudes is seek-length given in units of 10,000 data tracks. Each point along the abscissa 608 corresponds to a seek of a seek-type family of seeks having the seek-length indicated.

With further reference to FIG. 6, in accordance with an embodiment of the present invention, data for six different seek-type families are shown. The six different seek-type families are: a forward (FWD) seek to ID, a FWD seek to middle diameter (MD), a FWD seek to OD, a reverse (REV) seek to ID, a REV seek to MD and a REV seek to OD. The reference amplitudes are grouped into six families 610, 614, 618, 620, 624 and 628 of reference amplitudes corresponding to one of the six different seek-type families, which are identified by the line types shown in the legend of FIG. 6. Reference-amplitude families are associated with seek-type families, as follows: reference-amplitude family 610, with the FWD seek to ID; reference-amplitude family 614, with the FWD seek to MD; reference-amplitude family 618, with the FWD seek to OD; reference-amplitude family 620, with the REV seek to ID; reference-amplitude family 624, with the REV seek to MD; and, reference-amplitude family 628, with the REV seek to OD.

With further reference to FIG. 6, in accordance with an embodiment of the present invention, the reference amplitudes in some of the seek-type families are rather large, as may be expected for a first VCMS used to excite a resonant frequency of a seek-induced vibration of a component part, for example, flexible cable 156, of HDD 100. For example, reference-amplitude family 610 has a reference amplitude 630 of about 1.90% of TP for a FWD seek to ID with a seek-length 634 of about 17,000 data tracks. FIG. 6 is useful because it shows the reduction in seek-induced RTV for the second VCMS when measurements of the reference amplitudes of the frequency-component in the first PES associated with a first VCMS for the seeks of the various seek-type families, shown in FIG. 6, are compared to measurements of the corresponding amplitudes, next shown in FIG. 7, of a frequency-component in a second PES associated with a second VCMS for the same seeks of the various seek-type families. In accordance with an embodiment of the present invention, the reduction in seek-induced RTV occurs after synthesizing a second VCMS with an amplitude of a frequency-component attenuated below the reference amplitude of the frequency-component in the first VCMS at a frequency in the resonance-band bracketing the resonant frequency associated with seek-induced RTV.

Figure 7:
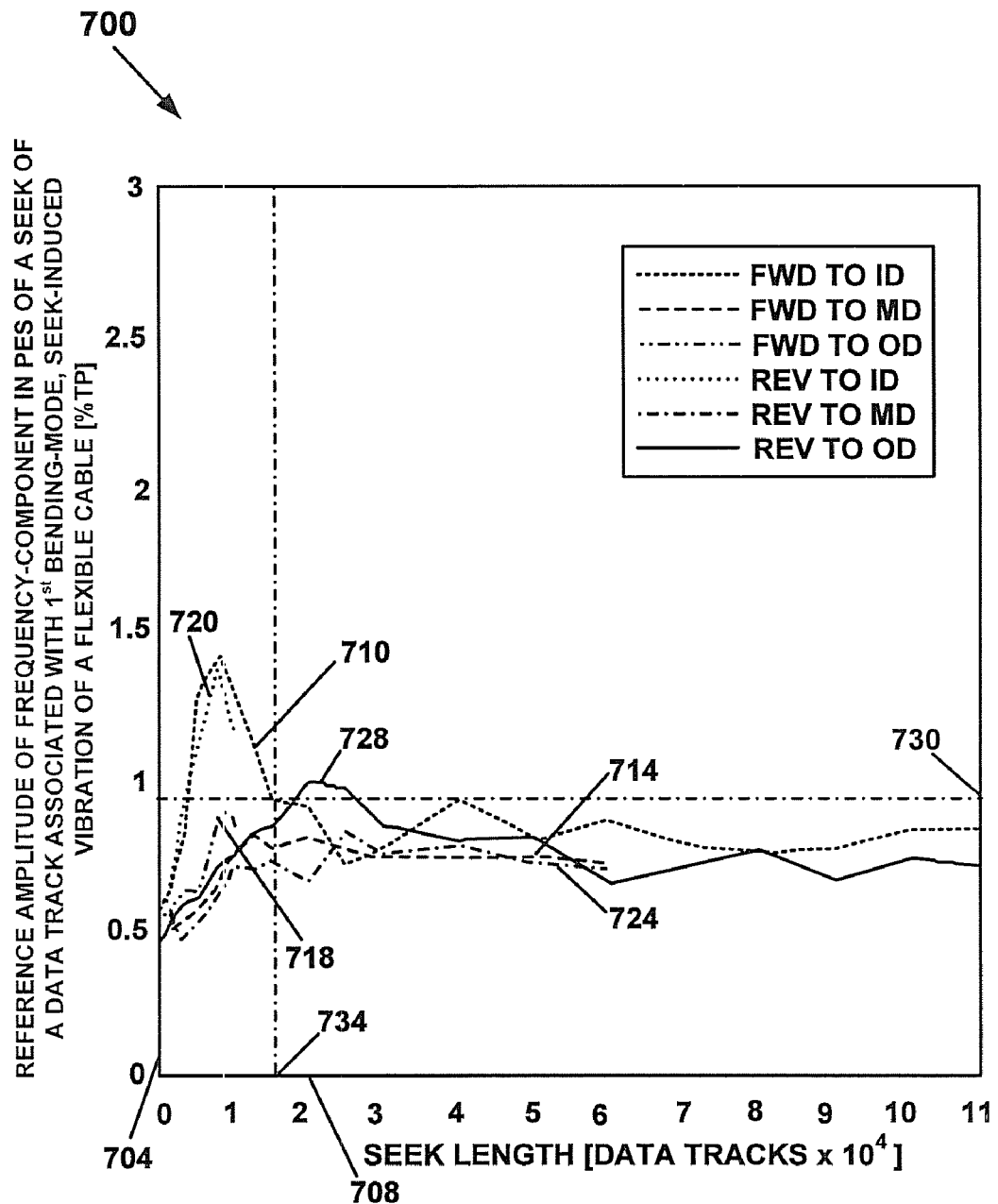
FIG. 7 is a plot of attenuated amplitudes of a frequency-component in the PES associated with the vibration of the component part in the HDD, the first bending mode vibration of the flexible cable of FIG. 3A, for various seeks to various data tracks as a function of seek-length of FIG. 6, in an embodiment of the present invention.

With reference now to FIG. 7, in accordance with an embodiment of the present invention, a plot 700 of amplitudes of a frequency-component in second PESs, similar to initial p-t-p amplitude 450 of the seek-induced RTV of the PES 410 shown in FIG. 4, is shown. The amplitudes are associated with the resonant frequency of a seek-induced vibration of a component part in the HDD, for example, the first bending mode vibration of the flexible cable 156 of FIG. 3A, for example, excited by the second VCMS in a seek to a data track, for example, data track 176. The amplitudes are shown as a function of various seeks to various data tracks as a function of seek-length. Each of the seeks is generated by a different second VCMS, which produces the same seek with the same seek-length, seek-direction and target data track of the corresponding seek in FIG. 6. Ordinate 704 of the plot 700 of the amplitudes is the percentage amplitude of the frequency component in the second PES of a seek to a data track, for example, data track 176, associated with the first bending-mode vibration of a flexible cable, for example, flexible cable 156; the ordinate 704 is given in units of percentage of TP. Abscissa 708 of the plot 700 of amplitudes is seek-length given in units of 10,000 data tracks. Each point along the abscissa 708 corresponds to a seek of a seek-type family of the same seeks shown in FIG. 6 having the seek-length indicated.

With further reference to FIG. 7, in accordance with an embodiment of the present invention, data for the same six different seek-type families that were shown in FIG. 6 are shown. The six different seek-type families are: a FWD seek to ID, a FWD seek to MD, a FWD seek to OD, a REV seek to ID, a REV seek to MD and a REV seek to OD. The amplitudes are grouped into six families 710, 714, 718, 720, 724 and 728 of amplitudes corresponding to one of the six different seek-type families, which are identified by the line types shown in the legend of FIG. 7. Amplitude families are associated with seek-type families, as follows: amplitude family 710, with the FWD seek to ID; amplitude family 714, with the FWD seek to MD; amplitude family 718, with the FWD seek to OD; amplitude family 720, with the REV seek to ID; amplitude family 724, with the REV seek to MD; and, amplitude family 728, with the REV seek to OD.

With further reference to FIG. 7, in accordance with an embodiment of the present invention, the amplitudes of most of the seeks in the seek-type families are smaller than the corresponding reference amplitudes shown in FIG. 6. For example, amplitude family 710 has a amplitude 730 of about 0.96% of TP for a FWD seek to ID with a seek-length 734 of about 17,000 data tracks. Thus, in accordance with embodiments of the present invention, the VCM circuit including the VCMS synthesizer 210 drives a voice-coil 140 of a VCM with the second VCMS reducing an amplitude of a frequency-component in a second PES of the seek of the data track associated with the second VCMS below the reference amplitude of the frequency-component in the first PES associated with the first VCMS.

Figure 8:
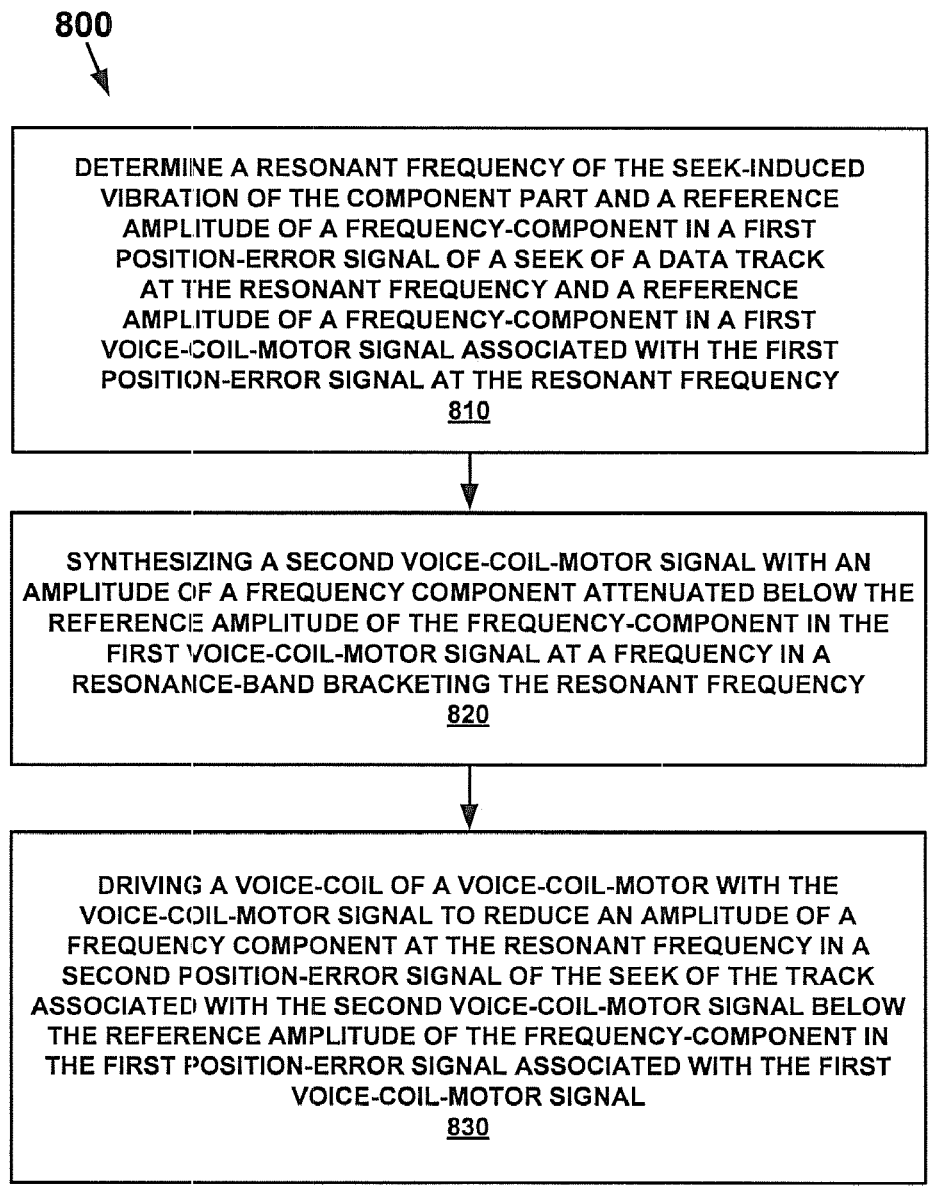
FIG. 8 is a flow chart illustrating a method for controlling the effects of seek-induced vibration of a component part in a HDD, in an embodiment of the present invention.

Description of Embodiments of the Present Invention for a Method for Controlling the Effects of Seek-Induced Vibration of a Component Part in a Hard-Disk Drive With reference now to FIG. 8, in accordance with an embodiment of the present invention, a flow chart 800 illustrates a method for controlling the effects of seek-induced vibration of a component part, for example, a flexible cable, in a HDD. At 810, a resonant frequency of the seek-induced vibration of the component part is determined; also, a reference amplitude of a frequency-component in a first PES of a seek of a data track at the resonant frequency is determined. In addition at 810, a reference amplitude of a frequency-component in a first VCMS associated with the first PES at the resonant frequency is determined. At 820, a second VCMS is synthesized with an amplitude of a frequency-component of the second VCMS attenuated below the reference amplitude of the frequency-component in the first VCMS at a frequency in a resonance-band bracketing the resonant frequency. At 830, a voice-coil of a VCM is driven with the second VCMS to reduce an amplitude of a frequency-component at the resonant frequency in a second PES of the seek of the data track associated with the second VCMS below the reference amplitude of the frequency-component in the first PES associated with the first VCMS. The component part of the HDD may be a flexible cable, a HAA, or an enclosure of the HDD.

With reference now to FIG. 9, in accordance with an embodiment of the present invention, a flow chart 900 illustrates a method for determining the resonant frequency in the method of FIG. 8. At 910, the first PES of a HAA attached to the VCM driven by the first VCMS is monitored in seeking the data track on the magnetic-recording disk. At 920, the resonant frequency is identified.

Figure 10:
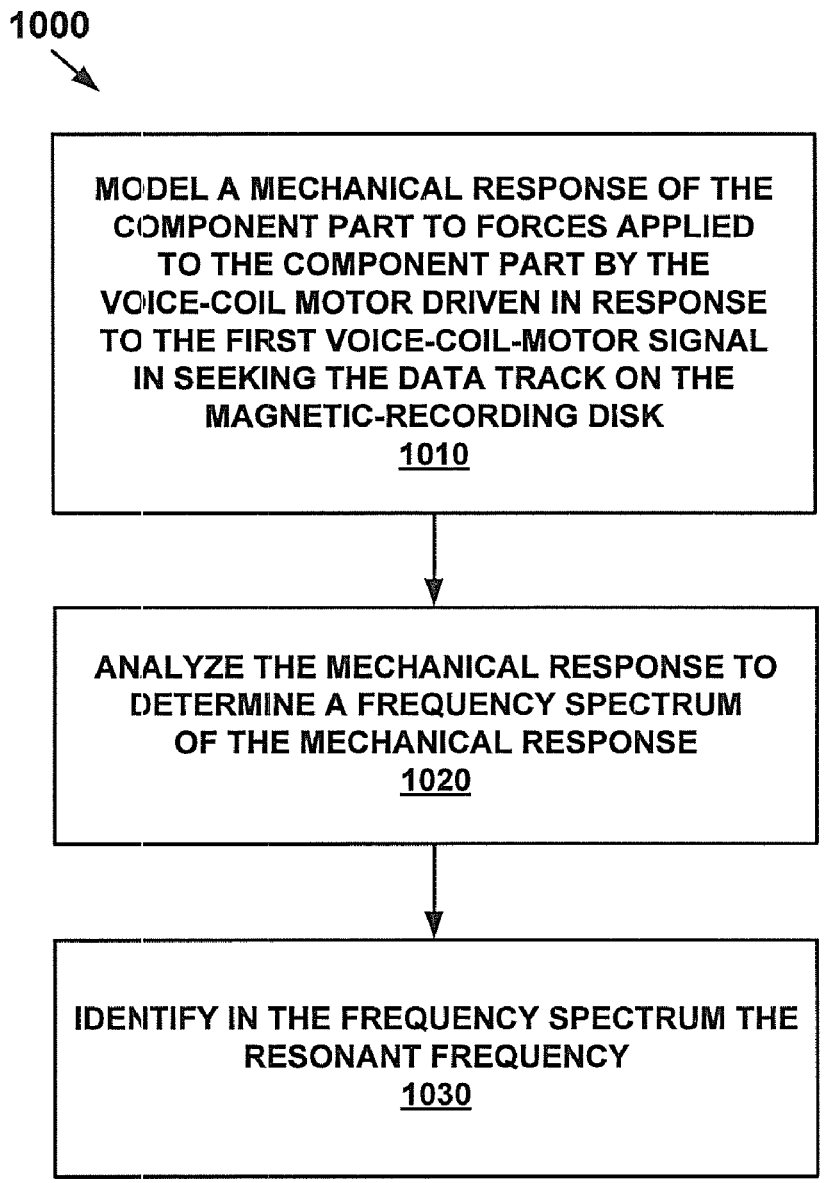
FIG. 10 is a flow chart illustrating an alternative method for determining the resonant frequency in the method of FIG. 8, in an embodiment of the present invention.

With reference to FIG. 10, in accordance with an embodiment of the present invention, a flow chart 1000 illustrates an alternative method for determining the resonant frequency in the method of FIG. 8. At 1010, a mechanical response of the component part is modeled for the application of forces to the component part by the VCM driven in response to the first VCMS in seeking the data track on the magnetic-recording disk. At 1020, the mechanical response is analyzed to determine a frequency spectrum, for example, a FRF, of the mechanical response. At 1030, the resonant frequency is identified in the frequency spectrum.

Figure 11:
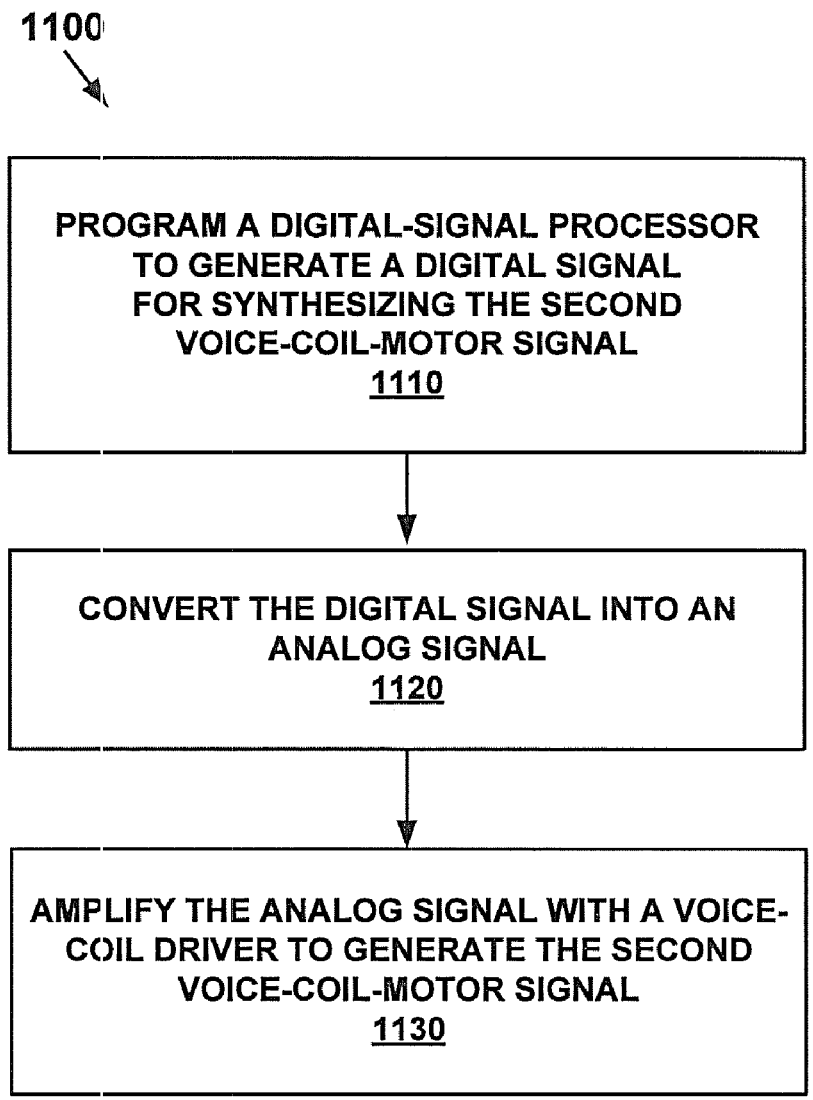
FIG. 11 is a flow chart illustrating a method for synthesizing the second VCMS in the method of FIG. 8, in an embodiment of the present invention.

With reference now to FIG. 11, in accordance with an embodiment of the present invention, a flow chart 1100 illustrates the method for synthesizing the second VCMS in the method of FIG. 8. At 1110, a digital-signal processor is instructed to generate a digital signal for synthesizing the second VCMS. At 1120, the digital signal is converted into an analog signal. At 1130, the analog signal is amplified with a voice-coil driver to generate the second VCMS.

With reference now to FIG. 12, in accordance with an embodiment of the present invention, a flow chart 1200 illustrates an alternative method for synthesizing the second VCMS in the method of FIG. 8. At 1210, to produce the power spectrum for the second VCMS, a portion of an amplitude of a first frequency-component in a power spectrum of the first VCMS at a first frequency in a resonance-band bracketing the resonant frequency of the component part is shifted away from the resonant frequency to a second frequency-component in a power spectrum of the first VCMS at a second frequency further from the resonant frequency than the first frequency. The second VCMS produced by the method of FIG. 8 decreases settling time below a settling time for the first VCMS in seeking the data track on the magnetic-recording disk.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for controlling the effects of seek-induced vibration of a component part in a hard-disk drive, said method comprising:
   determining a resonant frequency of said seek-induced vibration of said component part and a reference amplitude of a frequency-component in a first position-error signal of a seek of a data track at said resonant frequency and a reference amplitude of a frequency-component in a first voice-coil-motor signal associated with said first position-error signal at said resonant frequency;
   synthesizing a second voice-coil-motor signal with an amplitude of a frequency-component attenuated below said reference amplitude of said frequency-component in said first voice-coil-motor signal at a frequency in a resonance-band bracketing said resonant frequency; and
   driving a voice-coil of a voice-coil motor with said second voice-coil-motor signal to reduce an amplitude of a frequency-component at said resonant frequency in a second position-error signal of said seek of said data track associated with said second voice-coil-motor signal below said reference amplitude of said frequency-component in said first position-error signal associated with said first voice-coil-motor signal.

2. The method recited in claim 1, wherein said component part is a flexible cable of said hard-disk drive.

3. The method recited in claim 1, wherein said component part is a head-arm assembly of said hard-disk drive.

4. The method recited in claim 1, wherein said component part is an enclosure of said hard-disk drive.

5. The method recited in claim 1, wherein said determining said resonant frequency further comprises:
   monitoring said first position-error signal of a head-arm assembly attached to said voice-coil motor driven by said first voice-coil-motor signal in seeking said data track on said magnetic-recording disk; and
   identifying said resonant frequency.

6. The method recited in claim 1, wherein said determining said resonant frequency further comprises:
   modeling a mechanical response of said component part to forces applied to said component part by said voice-coil motor driven in response to said first voice-coil-motor signal in seeking said data track on said magnetic-recording disk;
   analyzing said mechanical response to determine a frequency spectrum of said mechanical response; and
   identifying in said frequency spectrum said resonant frequency.

7. The method recited in claim 1, wherein said synthesizing said second voice-coil-motor signal further comprises:
   instructing a digital-signal processor to generate a digital signal for synthesizing said second voice-coil-motor signal;
   converting said digital signal into an analog signal; and
   amplifying said analog signal with a voice-coil driver to generate said second voice-coil-motor signal.

8. The method recited in claim 1, wherein said synthesizing said second voice-coil-motor signal further comprises:
   shifting a portion of an amplitude of a first frequency-component in a power spectrum of said first voice-coil-motor signal at a first frequency in a resonance-band bracketing said resonant frequency of said component part away from said resonant frequency to a second frequency-component in said power spectrum of said first voice-coil-motor signal at a second frequency further from said resonant frequency than said first frequency to produce a power spectrum for said second voice-coil-motor signal.

9. The method recited in claim 1, wherein said second voice-coil-motor signal decreases settling time below a settling time for said first voice-coil-motor signal in seeking said data track on said magnetic-recording disk.

10. A voice-coil-motor circuit configured to control the effects of seek-induced vibration of a component part in a hard-disk drive, said voice-coil-motor circuit comprising:
    a voice-coil-motor-signal synthesizer configured to generate a second voice-coil-motor signal for a seek of a data track with an amplitude attenuated below a reference amplitude of a frequency-component of a first voice-coil-motor signal for said seek of said data track at a frequency in a resonance-band bracketing a resonant frequency of said seek-induced vibration of said component part; and
    a voice-coil motor electrically coupled to said voice-coil-motor-signal synthesizer and configured to be driven with said second voice-coil-motor signal to reduce an amplitude of a frequency-component at said resonant frequency in a second position-error signal associated with said second voice-coil-motor signal of said seek of said data track below a reference amplitude of a frequency-component in a first position-error signal associated with said first voice-coil-motor signal of said seek of said data track.

11. The voice-coil-motor circuit of claim 10, wherein said voice-coil-motor-signal synthesizer further comprises:
    a digital-signal processor instructed to generate a digital signal for synthesizing said second voice-coil-motor signal;
    a digital-to-analog convertor electrically coupled to said digital-signal processor wherein said digital-to-analog convertor converts said digital signal into an analog signal; and
    a voice-coil driver to amplify said analog signal to generate said second voice-coil-motor signal.

12. The voice-coil-motor circuit of claim 10, wherein said voice-coil-motor-signal synthesizer is configured to shift a portion of an amplitude of a first frequency-component in a power spectrum of said first voice-coil-motor signal at a first frequency in a resonance-band bracketing said resonant frequency of said component part away from said resonant frequency to a second frequency-component in said power spectrum of said first voice-coil-motor signal at a second frequency further from said resonant frequency than said first frequency to produce a power spectrum for said second voice-coil-motor signal.

13. The voice-coil-motor circuit of claim 10, wherein said component part is a flexible cable of said hard-disk drive.

14. The voice-coil-motor circuit of claim 10, wherein said component part is a head-arm assembly of said hard-disk drive.

15. The voice-coil-motor circuit of claim 10, wherein said component part is an enclosure of said hard-disk drive.

16. The voice-coil-motor circuit of claim 10, wherein said second voice-coil-motor signal decreases settling time below a settling time for said first voice-coil-motor signal in seeking said data track on said magnetic-recording disk.

17. A hard-disk drive configured to control the effects of seek-induced vibration of a component part in said hard-disk drive, said hard-disk drive comprising:
    an enclosure;
    a head-arm assembly comprising:
       a head-gimbal assembly comprising:
          a magnetic-recording head;
          a lead suspension attached to said magnetic-recording head; and
          a load beam attached at a gimbal portion of said load beam to a slider including said magnetic-recording head; and
       an arm attached to said head-gimbal assembly;
    said magnetic-recording disk rotatably mounted on a spindle;
    a drive motor mounted in said enclosure, said drive motor having a motor shaft attached to said spindle for rotating said magnetic-recording disk;
    a voice-coil motor comprising:
       an armature including a voice-coil attached to said arm; and
       a stator including a voice-coil magnet mounted in said enclosure;
       wherein said armature of said voice-coil motor is attached to said arm and is configured to move said head-arm assembly to access portions of said magnetic-recording disk; and
    a voice-coil-motor circuit comprising:
       a voice-coil-motor-signal synthesizer configured to generate a second voice-coil-motor signal for a seek of a data track with an amplitude attenuated below a reference amplitude of a frequency-component of a first voice-coil-motor signal for said seek of said data track at a frequency in a resonance-band bracketing a resonant frequency of said seek-induced vibration of said component part; and wherein said voice-coil motor is electrically coupled to said voice-coil-motor-signal synthesizer and is configured to be driven with said second voice-coil-motor signal to reduce an amplitude of a frequency-component at said resonant frequency in a second position-error signal of said seek of said data track associated with said second voice-coil-motor signal below a reference amplitude of a frequency-component in a first position-error signal of said seek of said data track associated with said first voice-coil-motor signal.

18. The hard-disk drive of claim 17, wherein said voice-coil-motor signal synthesizer further comprises:

a digital-signal processor instructed to generate a digital signal for synthesizing said second voice-coil-motor signal;

a digital-to-analog convertor electrically coupled to said digital-signal processor wherein said digital-to-analog convertor converts said digital signal into an analog signal; and a voice-coil driver to amplify said analog signal to generate said second voice-coil-motor signal.

19. The hard-disk drive of claim 17, wherein said voice-coil-motor-signal synthesizer is configured to shift a portion of an amplitude of a first frequency-component in a power spectrum of said first voice-coil-motor signal at a first frequency in a resonance-band bracketing said resonant frequency of said component part away from said resonant frequency to a second frequency-component in said power spectrum of said first voice-coil-motor signal at a second frequency further from said resonant frequency than said first frequency to produce a power spectrum for said second voice-coil-motor signal.

20. The hard-disk drive of claim 17, wherein said component part is a flexible cable of said hard-disk drive.

21. The hard-disk drive of claim 17, wherein said component part is a head-arm assembly of said hard-disk drive.

22. The hard-disk drive of claim 17, wherein said component part is an enclosure of said hard-disk drive.

23. The hard-disk drive of claim 17, wherein said second voice-coil-motor signal decreases settling time below a settling time for said first voice-coil-motor signal in seeking said data track on said magnetic-recording disk.

* * * * *